United States Patent
Furumi

(10) Patent No.: US 8,369,849 B2
(45) Date of Patent: Feb. 5, 2013

(54) WIRELESS COMMUNICATION TERMINAL, COMMUNICATION CONTROL METHOD OF WIRELESS COMMUNICATION TERMINAL, AND WIRELESS COMMUNICATION SYSTEM

(75) Inventor: Junichi Furumi, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 693 days.

(21) Appl. No.: 12/443,455

(22) PCT Filed: Sep. 28, 2007

(86) PCT No.: PCT/JP2007/068987
§ 371 (c)(1),
(2), (4) Date: Jan. 15, 2010

(87) PCT Pub. No.: WO2008/047577
PCT Pub. Date: Apr. 24, 2008

(65) Prior Publication Data
US 2010/0113018 A1    May 6, 2010

(30) Foreign Application Priority Data

Sep. 28, 2006    (JP) ................................. 2006-265891

(51) Int. Cl.
H04W 4/00 (2009.01)
(52) U.S. Cl. .................... 455/432.3; 455/434; 455/432.2
(58) Field of Classification Search ............... 455/432.3, 455/434, 435.1, 435.2, 435.3, 432.1, 436, 455/552.1, 553.1, 426.1, 447; 370/352, 329, 370/331
See application file for complete search history.

(56) References Cited

U.S. PATENT DOCUMENTS

| | | | |
|---|---|---|---|
| 6,138,010 A * | 10/2000 | Rabe et al. .................. | 455/426.1 |
| 7,657,282 B2 * | 2/2010 | Suzuki et al. .............. | 455/552.1 |
| 8,032,133 B2 * | 10/2011 | Niemela et al. ............ | 455/426.1 |
| 2002/0197992 A1 * | 12/2002 | Nizri et al. ..................... | 455/435 |
| 2003/0134637 A1 * | 7/2003 | Cooper ......................... | 455/432 |
| 2004/0087309 A1 * | 5/2004 | Joshi et al. ..................... | 455/450 |
| 2006/0229068 A1 * | 10/2006 | Niemela et al. ............ | 455/426.1 |
| 2008/0018543 A1 * | 1/2008 | Baliarda et al. ............... | 343/702 |
| 2008/0025376 A1 | 1/2008 | Keel et al. | |

FOREIGN PATENT DOCUMENTS

| | | |
|---|---|---|
| JP | 10-336757 | 12/1998 |
| JP | 2003-23665 | 1/2003 |

(Continued)

OTHER PUBLICATIONS

Japanese language office action dated Mar. 22, 2011 and its English language translation for corresponding Japanese application 2006265891 cites the foreign patent documents above.

*Primary Examiner* — Jean Gelin
(74) *Attorney, Agent, or Firm* — DLA Piper LLP (US)

(57) ABSTRACT

It is possible to provide a radio communication terminal, a radio communication terminal communication control method, and a radio communication system which can effectively capture a communication system and try connection by a communication method desired by a user even if judgment of a blind spot is made when a transmission operation is performed. The radio communication terminal includes at least: a communication system selection unit (185); and a capture instruction function execution unit (186). The communication system selection unit (185) reports a capture failure to a capture instruction function execution unit (186) only when all the communication systems in which the radio communication terminal can perform a system scan cannot be captured. Moreover, the capture instruction function execution unit (186) does not issue a system scan again unless the capture failure is reported as a result of all the system scan from the communication system selection unit (185).

15 Claims, 8 Drawing Sheets

FOREIGN PATENT DOCUMENTS

| | | |
|---|---|---|
| JP | 2003153325 A | 5/2003 |
| JP | 2005184355 A | 7/2005 |
| JP | 2006-203419 | 8/2006 |
| JP | 2006229827 A | 8/2006 |
| WO | WO 00/27158 | 5/2000 |
| WO | 2006078234 A1 | 7/2006 |

* cited by examiner

10A

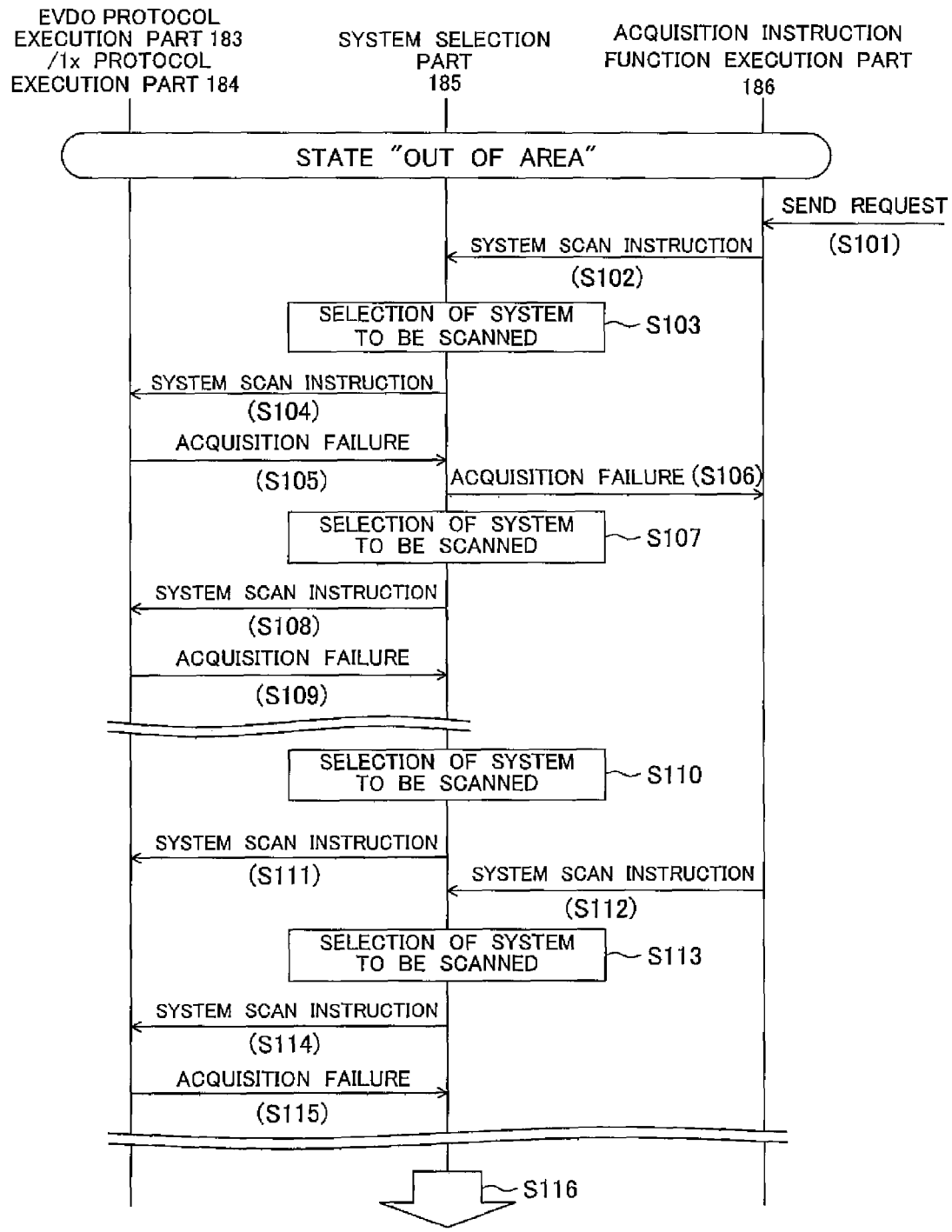

WIRELESS COMMUNICATION TERMINAL, COMMUNICATION CONTROL METHOD OF WIRELESS COMMUNICATION TERMINAL, AND WIRELESS COMMUNICATION SYSTEM

CROSS-REFERENCE TO RELATED APPLICATIONS

This application is a national stage of international application No. PCT/JP2007/068987, filed on Sep. 28, 2007, and claims the benefit of priority under 35 U.S.C. 119 of Japanese Patent Application No. 2006-265891, filed on Sep. 28, 2006, which are incorporated herein by reference.

TECHNICAL FIELD

The present invention relates to a wireless communication terminal, a communication control method of a wireless communication terminal, and a wireless communication system which are applicable to, for example, a multiband wireless communication system.

BACKGROUND ART

A wireless communication terminal applied to, for example, CDMA (Code Division Multiple Access) communication starts a channel acquisition operation when sending or receiving a signal or when transferring data. Further, the terminal obtains configuration information and timing information of the acquired channel, and obtains position registration information etc. synchronized with the timing of the acquired channel.

The received field strength of this channel sometimes remarkably falls according to a usage environment of the wireless communication terminal (topography, buildings, etc.) When the received field strength of the channel is low, regardless of that the fact that the signal of the channel was received, it is judged that the channel could not be acquired and "in-area" reset processing is shifted to.

In this "in-area" reset processing, the wireless communication terminal runs a system scan where it acquires a channel by a predetermined cycle.

In this regard, when the wireless communication terminal is out of the area, the wireless communication terminal internally turns a flag showing it is "out of area" (out-of-area flag) ON. In such a situation, even if the user performs a send operation, the terminal will not start up the send processing since the possibility of transmission is low while the out-of-area flag is ON and in general for saving power.

Further, once a terminal is judged "out of area", the "in-area" reset processing is carried out by a predetermined cycle, but the communication schemes for running a system scan for reset are limited and the time required for "in-area" reset can no longer be ignored.

For example, when exiting from or entering to a tunnel or at another where the usage environment is extremely different, desirably the "in-area" reset processing is carried out immediately after exiting from the tunnel. However, immediate reset is not possible unless at the timing of an "in-area" reset acquisition operation. Further, even if performing the "in-area" reset acquisition processing, this does not always lead to an immediate "in-area" reset.

In order to overcome the problem described above, the art is known of performing a channel acquisition operation if performing a send operation even when the terminal is judged "out of area" (see, for example, Patent Document 1).

Patent Document 1: Japanese Patent Publication (A) No. 2003-23665

DISCLOSURE OF THE INVENTION

Problem to be Solved by the Invention

According to the art disclosed in the above Patent Document 1, the call success rate can be improved in "in-area" reset processing.

However, recently, it has become possible for one wireless communication terminal to use a plurality of frequency bands (for example, 800 MHz and 2 GHz). Further, wireless communication terminals able to handle a plurality of communication protocols (CDMA2000 1x, EVDO: Evolution Data Only) have been increasing.

Under such a situation, with just "in-area" reset acquisition processing of a plurality of channels for a single communication system, the signal will not necessarily be sent by the communication scheme desired by the user.

The present invention provides a wireless communication terminal adaptive to a plurality of communication schemes, a communication control method of a wireless communication terminal, and a wireless communication system which efficiently performs acquisition of a communication system and which can attempt connection by the communication scheme desired by the user as much as possible when the wireless communication terminal performs a send operation even in a state judged "out of area".

Means for Solving the Problems

A first aspect of the present invention is a wireless communication terminal including: a communication part capable of acquiring a plurality of communication systems and capable of both communication by a first communication protocol and communication by a second communication protocol, an operation part, and a control part which controls communication by the communication part by any of the plurality of communication systems using the first communication protocol or second communication protocol when the start of communication is instructed by the operation part, wherein the control part has a communication system selection part instructing the communication part of the communication system to be acquired, a first protocol execution part instructing the communication part of acquisition by the first communication protocol, a second protocol execution part instructing the communication part of acquisition by the second communication protocol, and an acquisition instruction function execution part instructing the communication system selection part of the start of acquisition of the communication system, the acquisition instruction function execution part sends to the communication system selection part a first acquisition instruction instructing the acquisition of any of the plurality of communication systems when detecting a send operation by the operation part in a state judged "out of area" in which communication cannot be carried out, sends to the communication system selection part a second acquisition instruction when acquisition failure is informed for the first acquisition instruction, and performs processing for starting communication by a successful acquired communication system when acquisition success is informed for the first acquisition instruction or the second acquisition instruction, and the communication system selection part makes the first protocol execution part perform the acquisition processing according to the first acquisition instruction for each of the plurality of communication systems until the acquisition is successful, informs the acquisition instruction function execution part that the acquisition failed when acquisition failed in all of the communication systems, and informs the acquisition instruction function execution part that the acquisition was successful when the acquisition was successful in any communication system and makes the second protocol execution part perform the acquisition processing according to the second acquisition instruction for each of said plurality of communication systems until the acquisition is successful, informs the acquisition instruction function execution part of the acquisition failure when acquisition failed in all communication systems, and informs the acquisition instruction function execution part of the acquisition success when the acquisition is successful in any communication system.

Further, the acquisition instruction function execution part judges if there was any notification of acquisition failure when a first predetermined time passes from when the first acquisition instruction was carried out and judges if there was any notification of acquisition failure by a cycle of a second predetermined time shorter than the first predetermined time when acquisition failure is not informed.

Further, preferably, the plurality of communication systems are communication systems with different frequency bands.

Further, preferably, the plurality of communication systems include communication systems with different band classes in CDMA (Code Division Multiple Access) communication.

Further, preferably, the plurality of communication systems include a primary channel and a secondary channel relating to communication systems with different band classes.

Further, preferably, the terminal further has a display part, and the acquisition instruction function execution part detects a send operation by the operation part in a state judged "out of area" and makes the display part display the failure of the send operation when acquisition failure by the second acquisition instruction is informed after acquisition failure by the first acquisition instruction is informed.

Further, preferably, the state "out of area" is defined as a state where neither the first protocol execution part nor the second protocol execution part can acquire any of the plurality of communication systems, the acquisition instruction function execution part makes the display part display "out of area", and the "in-area" reset processing by the communication part is executed.

Further, preferably, the communication system selection part repeatedly executes the acquisition processing based on the first acquisition instruction during a first predetermined time.

Further, preferably, the acquisition instruction function execution part sends the communication system selection part a third acquisition instruction when the send operation is an operation for voice transmission, the communication system selection part makes the second protocol execution part perform the acquisition processing for each of the plurality of communication systems until the acquisition is successful when receiving the third acquisition instruction, informs the acquisition instruction function execution part of the failure of acquisition when acquisition fails in all of the communication systems, and informs the acquisition instruction function execution part that the acquisition is successful when the acquisition is successful in any communication system.

Further, preferably, the acquisition instruction function execution part sends the communication system selection part a third acquisition instruction when the send operation is an operation for voice transmission, and the communication system selection part makes the second protocol execution part perform the acquisition processing for each of the plurality of communication systems according to the third acquisition instruction until the acquisition is successful, informs the acquisition instruction function execution part of the failure of acquisition when acquisition fails in all communication systems, and informs it that the acquisition is successful when the acquisition is successful in any communication system.

Further, a communication control method of a wireless communication terminal of a second aspect of the present invention is a communication control method of a wireless communication terminal having; a communication system selection part; and a control part including a first protocol execution part, a second protocol execution part, and an acquisition instruction function execution part, which can acquire a plurality of communication systems, which can execute both communication according to a first communication protocol and communication according to a second communication protocol, and which can control communication by any of the plurality of communication systems by using the first communication protocol or second communication protocol when start of communication is instructed by a predetermined operation. The method has: a first step in which the acquisition instruction function execution part sends the communication system selection part, a first acquisition instruction instructing the acquisition of any of the plurality of communication systems when detecting a send operation in a state judged "out of area" in which communication cannot be carried out; a second step in which the first protocol execution part executes the acquisition processing based on the first step, for each of the plurality of communication systems until the acquisition is successful, a third step in which the communication system selection part informs the acquisition instruction function execution part, the failure of acquisition when acquisition is not possible in any of the communication systems in the second step, a fourth step in which the acquisition instruction function execution part receives a notification of the acquisition failure and send the communication system selection part a second acquisition instruction, a fifth step in which the second protocol execution part executes the acquisition processing based on the fourth step for each of the plurality of communication systems until the acquisition is successful, a sixth step in which the communication system selection part informs the acquisition instruction function execution part, the failure of acquisition when acquisition is not possible in any of all communication systems in the fifth step, a seventh step in which the communication system selection part informs the acquisition instruction function execution part, the success of acquisition when the acquisition is successful in any communication system in the second step or fifth step, and an eighth step in which the acquisition instruction function execution part receives the notification of success of acquisition and performs processing for starting communication by the successfully acquired communication system.

A wireless communication system of a third aspect of the present invention includes a base station, and a wireless communication terminal performing wireless communication with the base station through a channel assigned by the base station. The wireless communication terminal has; a communication part capable of acquiring a plurality of communication systems and capable of executing both of communication according to a first communication protocol and communication according to a second communication protocol, an operation part, and a control part which controls communication by the communication part by using the first communication protocol or second communication protocol in any of the plurality of communication systems when start of communication is instructed by the operation part. The control part includes a communication system selection part instructing the communication part of the communication system to be acquired, a first protocol execution part instructing the communication part of the acquisition by the first communication protocol, a second protocol execution part instructing the communication part of the acquisition by the second communication protocol, and an acquisition instruction function execution part instructing the communication system selection part of the start of acquisition of the communication system. The acquisition instruction function execution part sends the communication system selection part a first acquisition instruction instructing the acquisition of any of the plurality of communication systems when detecting a send operation by the operation part in a state judged "out of area" in which communication cannot be carried out, sends the communication system selection part a second acquisition instruction when acquisition failure is informed for the first acquisition instruction, and performs processing to start communication by a successfully acquired communication system when acquisition success is informed for the first acquisition instruction or the second acquisition instruction, and the communication system selection part makes the first protocol execution part perform the acquisition processing according to the first acquisition instruction for each of the plurality of communication systems until the acquisition is successful, informs the acquisition instruction function execution part that the acquisition failed when acquisition fails in all communication systems, while informs the acquisition instruction function execution part that acquisition is successful when acquisition is successful in any communication system and makes the second protocol execution part perform the acquisition processing according to the second acquisition instruction for each of the plurality of communication systems until the acquisition is successful, informs the acquisition instruction function execution part of acquisition failure when acquisition fails in all communication systems, while informs the acquisition instruction function execution part of acquisition success when acquisition is successful in any communication system.

EFFECTS OF THE INVENTION

According to the present invention, even in a state judged "out of area", a communication system is efficiently acquired when a send operation is carried out, so connection according to the communication scheme desired by the user can be attempted as much as possible.

BRIEF DESCRIPTION OF THE DRAWINGS

FIG. 4 is an operation sequence diagram cited for explaining the operation of a wireless communication terminal according to a first embodiment of the present invention.

EXPLANATION OF NOTATIONS

10 . . . wireless communication terminal, 11 . . . communication part, 12 . . . operation part, 13 . . . voice processing part, 14 . . . speaker, 15 . . . microphone, 16 . . . display part, 17 . . . memory part, 18 . . . control part, 181 . . . key detection part, 182 . . . display control part, 1183 . . . EVDO protocol execution part (first protocol execution part), 184 . . . 1x protocol execution part (second protocol execution part), 185 . . . communication system selection part, 186 . . . acquisition instruction function execution part, 1850 . . . scan list, and 1860 . . . acquired result report region.

BEST MODE FOR CARRYING OUT THE INVENTION

Below, embodiments of the present invention will be explained with reference to the attached drawings.

First, a communication system to which a wireless communication terminal according to an embodiment of the present invention can be applied will be explained.

Figure 1:
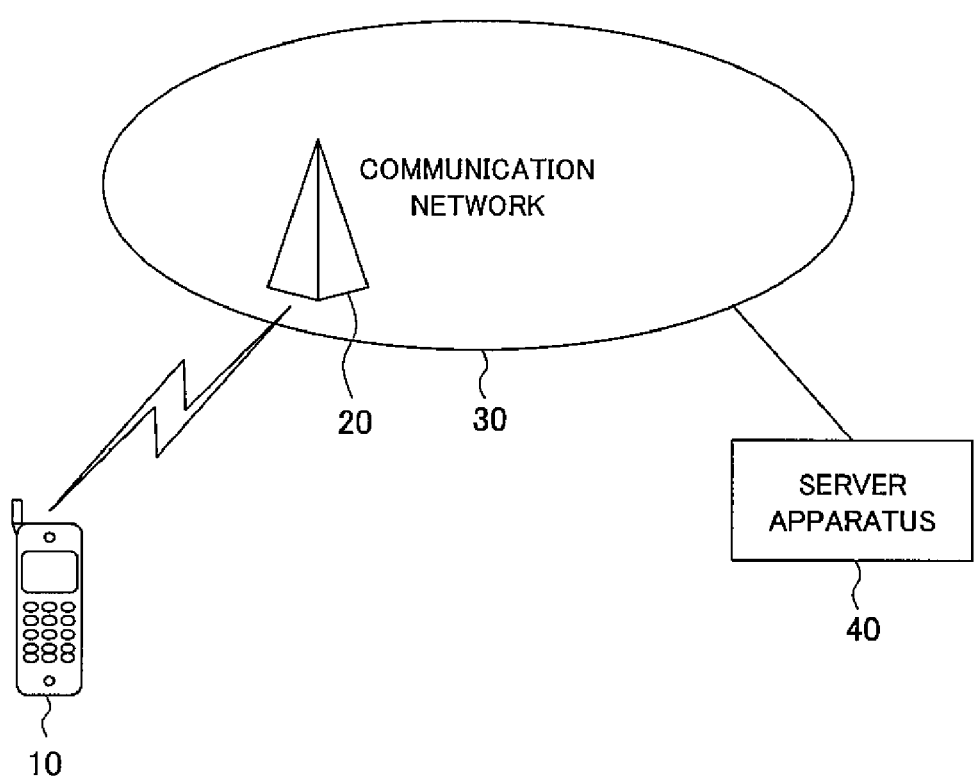
FIG. 1 is a view of a system configuration showing a wireless communication system to which a wireless communication terminal according to an embodiment of the present invention is applied.

FIG. 1 is a view of the system configuration showing a wireless communication system to which a wireless communication terminal according to an embodiment of the present invention is applied.

A wireless communication system 1 is, as shown in FIG. 1, configured by a wireless communication terminal 10, base station 20, communication network 30, and server apparatus 40.

The wireless communication terminal 10 according to the present embodiment, as shown in FIG. 1, has a function of using the wireless communication part to request desired data via the base station 20 and through the communication network 30 to the server apparatus 40 and displaying Web data or other information obtained via the base station 20 in response to the request on the display part.

Note that, in the present embodiment, the explanation will be given illustrating a mobile phone as the wireless communication terminal. Note that, in the present embodiment, while the explanation is given illustrating a mobile phone as the wireless communication terminal, the embodiment can be applied to other wireless communication terminals as well.

In recent years, in the wireless communication system 1, effective utilization of the frequency bands used has been promoted. Reorganization of frequency bands has been studied for making the frequencies used match with standard global specifications.

For example, in a wireless communication system using CDMA2000 1x, at present, in Japan, the Japanese specification 800 MHz band (hereinafter, referred to as "the present 800 MHz band") is being used. There are plans for reorganizing this frequency band to a new 800 MHz band of the standard global specification.

Note that, the present 800 MHz band and the new 800 MHz band differ in frequency assignment etc. between the uplink (communication from the wireless communication terminal 10 to the base station 20 side) and downlink (communication from the base station 20 side to the wireless communication terminal 10) in the frequency band used.

In view of this background, a multiband wireless communication terminal capable of communication in the present frequency band (present 800 MHz), new frequency band (new 800 MHz), and high frequency band (2 GHz) is being developed.

A multiband wireless communication terminal 10 engages in wireless communication with the base station 20 through the channel assigned by the base station 20. At this time, the wireless communication terminal 10 can transmit and receive wireless signals in a plurality of frequency bands. Specifically, the wireless communication terminal 10 can transmit and receive wireless signals by using the existing frequency band (old 800 MHz), new frequency band (new 800 MHz), and high frequency band (2 GHz).

The above communication systems with different frequency bands are assigned identification numbers for the base station 20 and the wireless communication terminal 10 to discriminate the frequency bands constituted by the "band classes" prescribed in 3GPP2 (3rd Generation Partnership Project 2).

For example, in a list of nearby base stations etc. in information informed from the base station 20 to the wireless communication terminal 10, this band class is used for reporting the communication systems existing around the wireless communication terminal 10 and so on.

Note that, the existing frequency band (present 800 MHz) is classified as the "band class 3", the new frequency band (new 800 MHz) is classified as the "band class 0", and the high frequency band (2 GHz) is classified as the "band class 6".

Further, each band class is assigned a primary channel and a secondary channel (however, only the primary channel in the EVDO communication of band class 6). Further, when considering the difference of protocols (EVDO), there are a total of 11 patterns of communication systems.

Below, a multiband wireless communication terminal 10 having the above 11 patterns of communication systems will be explained in detail.

Figure 2:
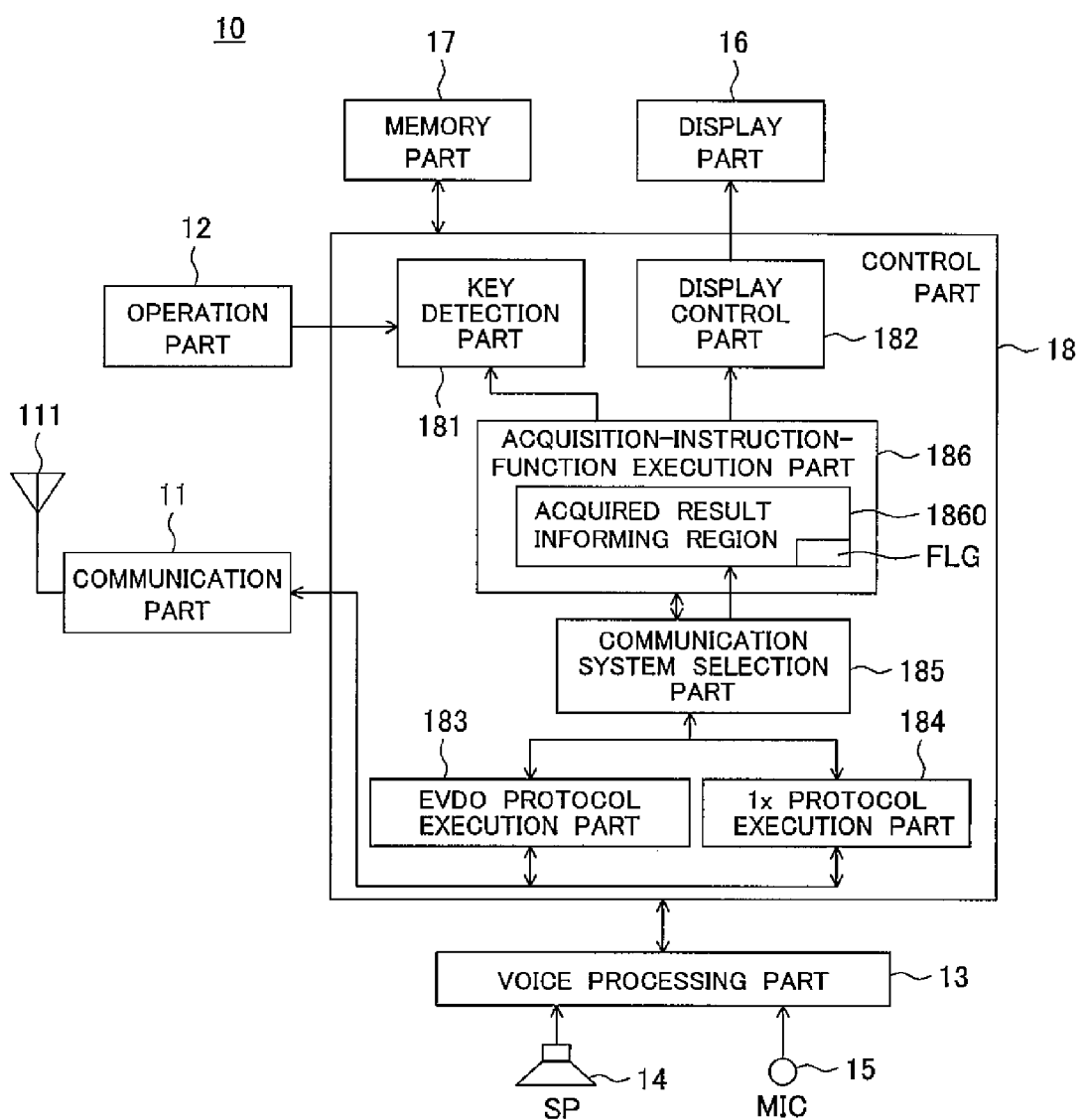
FIG. 2 is a block diagram showing the configuration of an internal portion of a wireless communication terminal according to an embodiment of the present invention.

FIG. 2 is a block diagram showing an example of the configuration of a signal processing system of a wireless communication terminal according to an embodiment of the present invention.

Here, functional blocks of a signal processing system in a mobile phone used as the wireless communication terminal 10 will be illustrated as explained above.

This wireless communication terminal 10 used as a mobile phone has a communication part 11, operation part 12, voice processing part 13, speaker 14, microphone 15, display part 16, memory part 17, and control part 18.

The communication part 11 acquires a plurality of communication systems provided by the same carrier and engages in wireless communication with the base station 20 connected to the communication network 30 according to a first communication protocol (for example EVDO) and a second communication protocol (for example, CDMA2000_1x: hereinafter, abbreviated as "1x").

Note that, EVDO communication is faster than 1x communication. 1x communication has the feature of supporting voice communication as well unlike EVDO communication.

The communication part 11 applies predetermined modulation processing to transmission data output by the control part 18 to convert this to a wireless signal which it then transmits via an antenna 111. Further, it applies predetermined demodulation processing to a wireless signal from the base station 20 received at the antenna 111 to convert this to reception data which it then outputs to the control part 18.

The operation part 12 has, for example, a power key, speak key, number keys, letter keys, direction keys, an execute key, a send key, and other keys to which various functions are assigned. When these keys are operated by the user, the operation part 12 generates signals corresponding to those operation contents and inputs these as an instruction of the user to the control part 18.

The voice processing part 13 processes an audio signal output at the speaker 14 and audio signal input at the microphone 15.

Namely, the voice processing part 13 amplifies voice input from the microphone 15, performs analog-to-digital conversion, and further applies encoding or other signal processing to this to convert it to digital audio data and outputs the result to the control part 18.

Further, the voice processing part 13 applies decoding, digital-to-analog conversion, amplification, or other signal processing to the audio data supplied from the control part 18 to convert it to an analog audio signal and outputs the result to the speaker 14.

The display part 16 is configured by using, for example, a liquid crystal display panel, an organic EL (Electro-Luminescence) panel, or other display device and displays an image in accordance with a video signal supplied from the control part 18.

The display part 16 displays, for example, a phone number of a destination at the time of a send operation, a phone number of the other party at the time of the reception, contents of received mail and transmitted mail, the date, time, remaining battery power, success of a send operation, a waiting screen, and other various information and images.

The memory part 17 stores various types of data utilized for the processing in the control part 18.

The memory part 17 holds, for example, a program of a computer provided in the control part 18, an address book for managing personal information such as phone numbers and e-mail addresses of other parties, an audio file for playing back an incoming call sound and an alarm sound, an image file for the waiting screen, various types of setting data, temporary data utilized in the processing process of the program, and so on.

Note that, the above memory part 17 is configured by, for example, a nonvolatile memory device (nonvolatile semiconductor memory, hard disc device, optical disc device, etc.), a random accessible memory device (for example, SRAM or DRAM), or the like.

The control part 18 centrally controls the entire operation of the mobile phone.

Namely, the control part 18 controls operations of blocks explained above so that various types of processing of the mobile phone are executed in a suitable sequence in accordance with the operation of the operation part 12.

Here, as various types of processing of the mobile phone, there can be mentioned audio speech carried out through a line exchange network, preparation and transmission/reception of e-mails, viewing of Internet Web (World Wide Web) sites, and so on. Further, the control of operations of the blocks explained above includes the transmission/reception of signals at the communication part 11, input/output of voice at the voice processing part 13, display of an image in the display part 16, and other control.

The control part 18 is provided with a computer (microprocessor) executing processing based on a program (operating system, application program, etc.) stored in the memory part 17 and runs the processing explained above according to the sequence instructed in this program.

Namely, the control part 18 sequentially reads command codes from the operating system, application program, or other program stored in the memory part 17 to execute the processing.

The control part 18 has a function of controlling the communication by the communication part 11 by using a first communication protocol (for example, EVDO: Evolution Data Only) or a second communication protocol (for example, "1x" protocol) in any of the plurality of communication systems when the start of communication is instructed by the operation part 12.

The control part 18 is, as shown in FIG. 2, configured by a key detection part 181, display control part 182, EVDO protocol execution part 183, "1x" protocol execution part 184, communication system selection part 185, and acquisition instruction function execution part 186.

The key detection part 181 has a function of detecting a send operation from the operation part 12 and activating the acquisition processing by the acquisition instruction function execution part 186, while the display control part 182 has a function of displaying success or failure of the send output via the acquisition instruction function execution part 186 in the display part 16.

Further, the EVDO protocol execution part 183 functions as the first protocol execution part instructing the communication part 11 of acquisition by the first communication protocol (EVDO).

The 1x protocol execution part 184 functions as a second protocol execution part instructing the communication part 11 of acquisition by the second communication protocol ("1x" protocol).

The communication system selection part 185 has a function of instructing the communication part 11 of the communication system to be acquired.

The acquisition instruction function execution part 186 sends the communication system selection part 185 an instruction of start of acquisition of a communication system. When detecting a send operation by the operation part 12 in a state judged "out of area" where the mobile phone cannot communicate, the part sends the communication system selection part 185 a first acquisition instruction instructing the acquisition of any of the plurality of communication systems.

When acquisition failure is informed for this first acquisition instruction, the acquisition instruction function execution part 186 has a function of sending the communication system selection part 185 a second acquisition instruction and, when acquisition success is informed for the above first acquisition instruction or second acquisition instruction, performing processing for starting the communication by the successfully acquired communication system.

Note that the acquisition instruction function execution part 186 has an acquired result report region 1860 including a flag FLG. Here, the result of acquisition (acquisition failure) for each communication system which is informed by the communication system selection part 185 is set at the flag FLG (flag is made ON). This flag FLG is updated and retained at each system scan.

The result of acquisition of the communication system written (set) in the flag FLG of the acquired result report region 1860 is checked by the acquisition instruction function execution part 186 at a suitable timing as will be explained later. This part performs re-try processing or processing making the display part 16 display the send failure.

Note that the acquired result report region 1860 shown here is concretely assigned to and stored at an appropriate region of the memory part 17.

Figure 3:
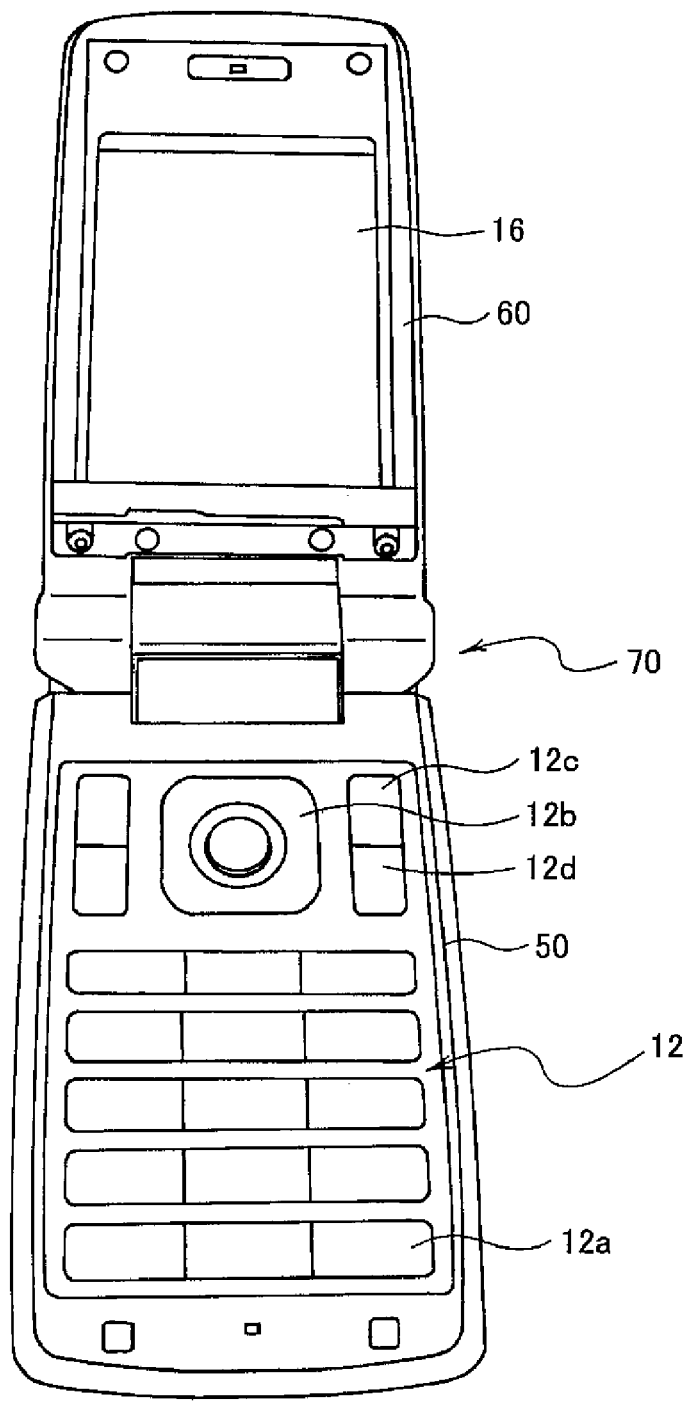
FIG. 3 is a perspective view showing an example of the configuration of an outer appearance of a mobile phone as a mobile terminal according to an embodiment of the present invention.

FIG. 3 is a perspective view showing an example of the configuration of the outer appearance of a mobile phone used as a wireless terminal device according to an embodiment of the present invention. FIG. 3 mainly shows the array of keys.

As shown in FIG. 3, a wireless terminal device 10A is configured as a so-called flip-open type mobile phone and is provided with a sender case 50 and a receiver case 60 which are connected to each other pivotably between an open state and a closed state.

The sender case 50 and the receiver case 60 form a housing of the wireless communication terminal as a whole by connection of end portions by a connection part 70 serving as the center axis of relative opening and closing operations.

The sender case 50 is provided with an operation input part 12 in which various types of keys are arranged exposed at the front surface. Further, the receiver case 60 is provided with a display part 16.

In the operation input part 12 of the sender case 50, as various types of keys, for example, a tenkey part 12a, a cursor key 12b, function keys 12c, etc. are arranged.

The keys of the tenkey part 12a described above are assigned pluralities of characters such as Sino-Japanese ideographs, alphanumerics, phonetic kana marks, and symbols.

The effective characters intended by the tenkey part 12a are switched by a toggle operation by an "input mode change key (identification key)" assigned to any of the function keys 12c.

Any of these keys, for example, a function key 12c, is assigned as the operation key for sending a send instruction etc.

Note that, this operation key may be assigned to a not shown side key as well which is arranged on a side surface of the sender case.

Next, two examples of operation of the wireless communication terminal 10 of FIG. 2 will be explained as a first embodiment and a second embodiment.

(First Embodiment)

FIG. 4 is an operation sequence diagram cited for explaining the operation of the wireless communication terminal according to the first embodiment of the present invention.

FIG. 4 shows an operation sequence among the EVDO protocol execution part 183 ("1x" protocol execution part 184), the communication system selection part 185, and the acquisition instruction function execution part 186 forming the control part 18. Further, FIG. 5 is a conceptual diagram of the operation diagrammatically showing those operations.

Below, the operation of the wireless communication terminal of FIG. 2 according to the first embodiment of the present invention will be explained with reference to FIG. 4 and FIG. 5.

Note that, in the following explanation, "out of area" means the state where a communication system cannot be acquired (at the inside, the out-of-area flag turns ON and an antenna mark displays "out of area" on the screen) and where the "in-area" reset processing is periodically executed.

Further, "in-area reset processing" means processing performing a system scan (reception frequency search), judging whether or not a channel (communication system) is usable by analyzing a pilot signal informed in that frequency, and acquiring the communication system when the pilot signal strength exceeds a predetermined level.

First, in the state where the wireless communication terminal (mobile phone) 10 is "out of area", if the user operates the operation part 12 of the wireless communication terminal 10 (depresses the send key etc.), the control part 18 obtains a send request via the key detection part 181 and starts up the acquisition instruction function execution part 186 (S101 of FIG. 5).

The acquisition instruction function execution part 186 obtains this send request and instructs a system scan by the send operation in order to acquire the communication system required for the send operation before performing the send processing.

This system scan is realized by starting up the selected EVDO protocol execution part 183 or the "1x" protocol execution part 184. The processing for selection of the execution part to be started is as follows.

Namely, the acquisition instruction function execution part 186 starts up the communication system selection part 185 (S102: system scan instruction).

The communication system selection part 185, based on "call" setting of the send operation, selects the EVDO protocol execution part 183 or the "1x" protocol execution part 184 in accordance with which communication system is to be searched for (S103).

Then, the part 185 starts up the selected EVDO protocol execution part 183 or the "1x" protocol execution part 184 whereby the system scan is realized (S104: system scan instruction).

The communication system selection part 185 selects the EVDO communication system in the case of data transmission or selects the "1x" communication system in the case of voice transmission and instructs the EVDO protocol execution part 183 or the "1x" protocol execution part 184 to execute the scan operation of same.

The EVDO protocol execution part 183 or the "1x" protocol execution part 184 selected by the communication system selection part 185 informs success/failure of acquisition of that communication system as the result of the system scan to the acquisition instruction function execution part 186 via the communication system selection part 185 (S105, S106).

When the acquisition of the communication system succeeds, the communication system selection part 185 instructs the send processing using that communication system to the acquisition instruction function execution part 186.

When the acquisition of the communication system fails, the communication system selection part 185 instructs the execution of the system scan again to the EVDO protocol execution part 183 or the "1x" protocol execution part 184 which previously executed the system scan in order to search another communication system by the same protocol (S107 to S111).

Note that the communication system covered by the system scan is sometimes a communication system covered by a system scan earlier and is sometimes another communication system of the same protocol not earlier scanned. At this time, the communication system selection part 185 simultaneously informs the acquisition instruction function execution part 186 of acquisition failure of the communication system. Here, "informing" means that outputting a signal showing the failure of acquisition of the communication system.

The acquisition instruction function execution part 186 waits to be informed of acquisition success from the communication system selection part 185 for, for example, 4 seconds after instructing the system scan to the communication system selection part 185. Here, when a report of acquisition success is not output from the communication system selection part 185 for 4 seconds, the acquisition instruction function execution part 186 instructs the communication system selection part 185 again to re-try the above system scan (S112).

The communication system selection part 185 and EVDO protocol execution part 183 or the "1x" protocol execution part 184 which had been selecting the communication system and acquiring the same cancel the communication system acquisition operation currently in progress based on the system scan instruction received again from the acquisition instruction function execution part 186, perform the system scan operation again, and inform success/failure of acquisition (S113 to S115).

Note that the communication system selection part 185 and EVDO protocol execution part 183 or the "1x" protocol execution part 184 repeat the acquisition operation of the communication system described above until the communication system can be acquired on the occasion of this system scan.

If the acquisition instruction function execution part 186 were to receive an acquisition success report from the communication system selection part 185, it would perform the send processing at that timing. The system scan is repeated forever by the re-try function of the acquisition instruction function execution part 186 until the system scan instruction is sent again or the send processing ends.

Note that, a timer function is provided for the send processing. The send operation automatically ends when the base station 20 cannot be communicated with even when the send operation is continued for 40 seconds (S116).

Figure 5A:
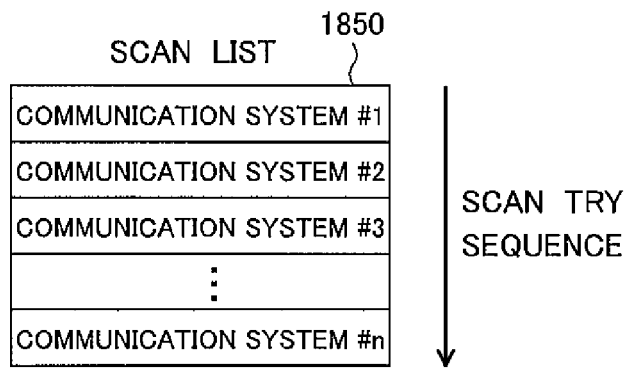
FIG. 5 is an operation conceptual diagram schematically showing the operation of a wireless communication terminal according to the first embodiment of the present invention.

According to the first embodiment described above, when a system scan due to a send operation is requested from the acquisition instruction function execution part 186, the communication system selection part 185 starts the selection of the communication system by referring to the scan list 1850 shown in, for example, FIG. 5A, in which candidates of communication systems to be acquired are listed.

Figure 5B:
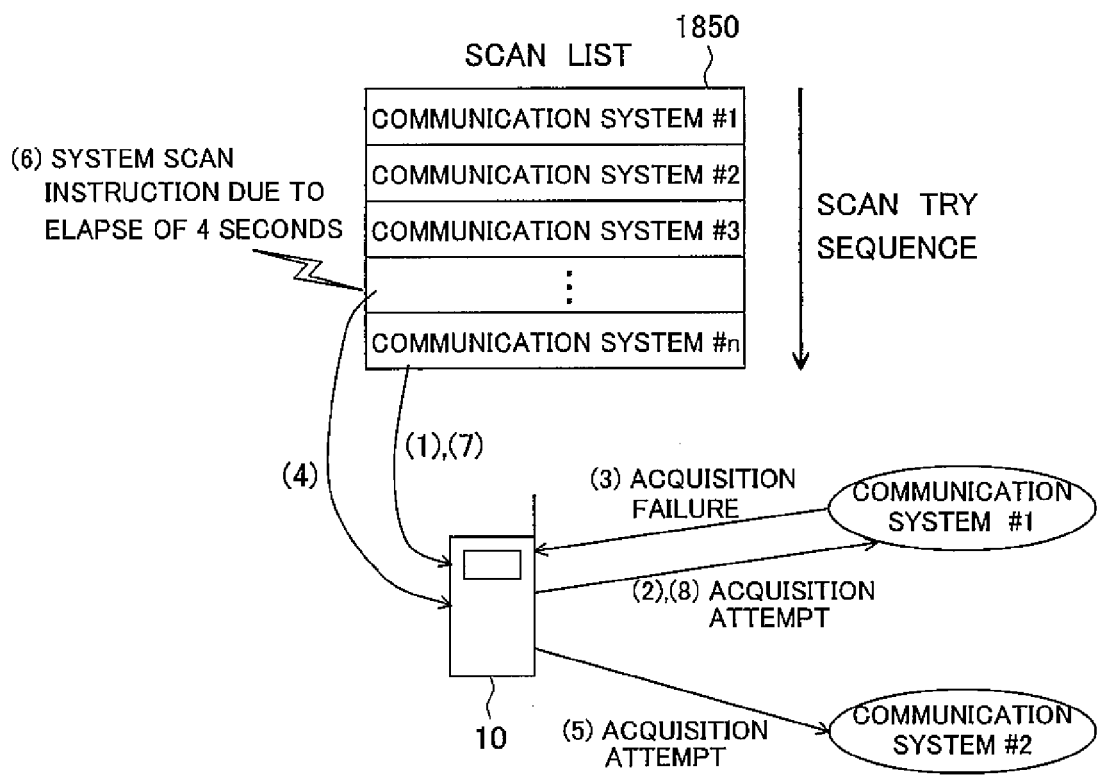

Namely, as shown in FIG. 5B, the communication system selection part 185 of the wireless communication terminal 10 outputs an acquisition instruction from a communication system #1 stored at the start of the indexes of the scan list 1850 (1).

The communication system selection part 185 controls the EVDO protocol execution part 183 or the "1x" protocol execution part 184 so as to try to acquire a communication system stored in the scan list 1850 until successfully acquiring one of the communication systems #1 to #n.

Specifically, the communication system selection part 185 obtains, as a search candidate, the communication system at the first index of the scan list 1850 (1). The communication system selection part 185, here, controls the EVDO protocol execution part 183 or the "1x" protocol execution part 184 so as to try to acquire the communication system #1 (2).

When receiving the report of the acquisition failure (3), the communication system selection part 185 obtains a search candidate (communication system #2) at the second index of the scan list 1850 (4). Then, the communication system selection part 185 controls the EVDO protocol execution part 183 or the "1x" protocol execution part 184 so as to try to acquire the communication system #2 (5).

The attempted acquisition of communication systems described above is repeated. When the acquisition is detected by the acquisition instruction function execution part 186 that 4 seconds have passed, the system scan is requested again, and the operations of (1) and (2) described above are repeated (7), (8).

As described above, when a system scan due to the send operation has not succeeded within 4 seconds at the time of a send operation "out of area", the acquisition instruction function execution part 186 requests the communication system selection part 185 to perform the system scan due to the send operation again. The communication system selection part 185 receives this and starts trying to acquire a system from the head communication system in the scan list 1850 again.

For example, when the communication system #2 runs into an obstacle in communication and 4 seconds are taken for attempting acquisition, the communication system selection part 185 requests a system scan due to an elapse of 4 seconds from the acquisition instruction function execution part 186.

For this reason, the communication system selection part 185 cannot attempt acquisition for the communication system #3 and on, so will attempt acquisition again from the communication system #1.

In such a case, during the send operation, the attempted acquisition operation is not executed forever for the communication system #3 and on. Even in an area where the signal of the communication system #3 is stable, regardless of the existence of a communication system which can be acquired, there is no opportunity of acquisition of that communication system, so the send operation may become impossible.

As described above, in the present first embodiment, the acquisition instruction function execution part 186 waits for 4 seconds to request the re-try of the system scan to the communication system selection part 185 as the result of the system scan by the send operation. Here, in a case where no response comes even when 4 seconds have passed or a case where the acquisition success is not informed, the acquisition instruction function execution part 186 outputs the system scan request again to the communication system selection part 185.

As opposed to this, the second embodiment explained below is set up so as to re-try acquisition for all of the communication systems #1 to #n in the routine for the system scan due to a send operation at the time of a send operation "out of area" and not to issue any system scan request due to a send operation again until a result of that is obtained.

Due to this, in the second embodiment, regardless of the existence of a communication system which can be acquired, there is no opportunity for acquisition of that communication system, therefore occurrence of a case where a send operation can no longer be carried out can be suppressed.

(Second Embodiment)

Figure 6:
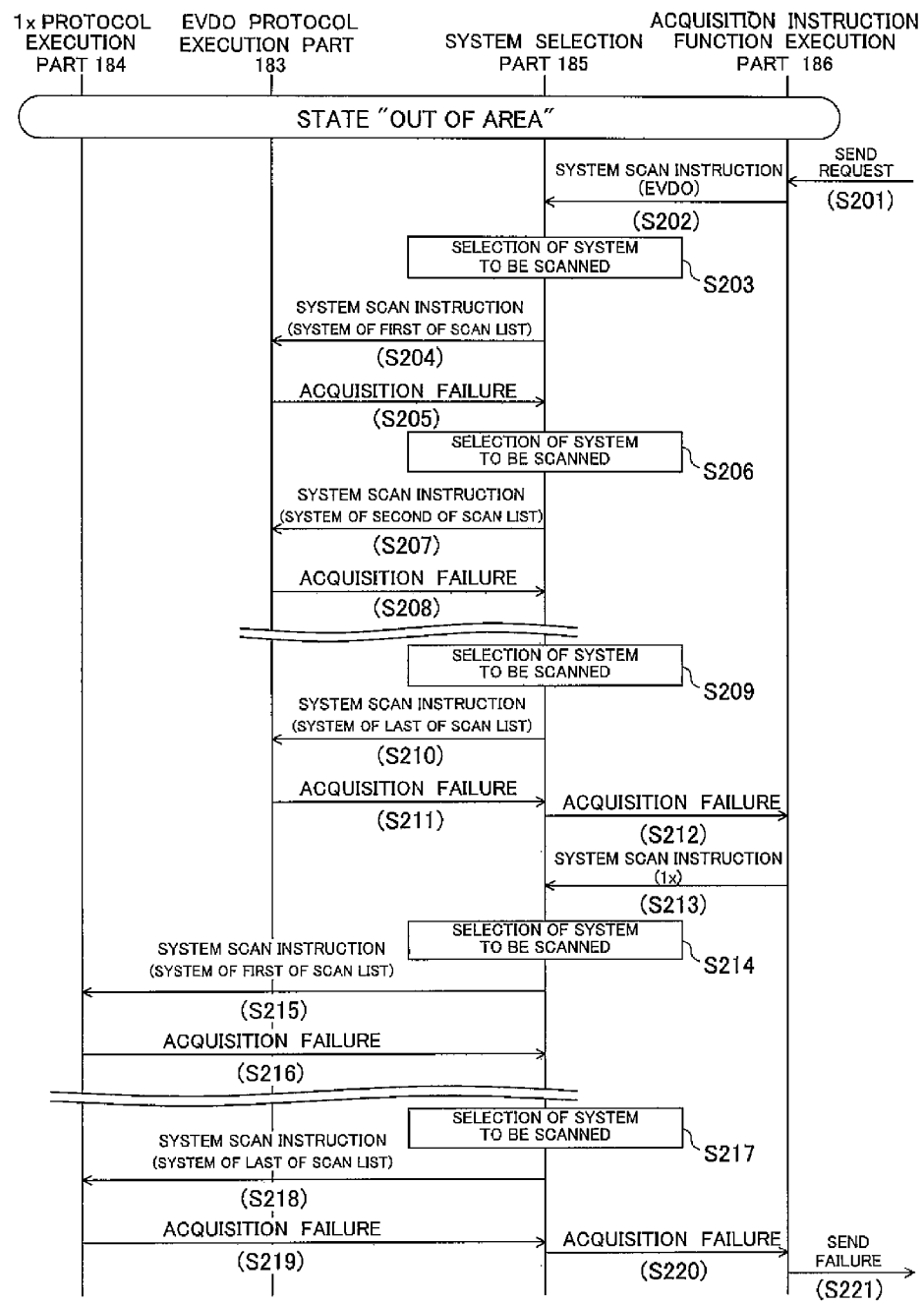
FIG. 6 is an operation sequence diagram cited for explaining the operation of a wireless communication terminal according to a second embodiment of the present invention.

FIG. 6 is a sequence diagram showing the operation of a wireless communication terminal according to the second embodiment of the present invention.

FIG. 6 shows an operation sequence among the "1x" protocol execution part 184, the EVDO protocol execution part 183, the communication system selection part 185, and the acquisition instruction function execution part 186 forming the control part 18.

Figure 7:
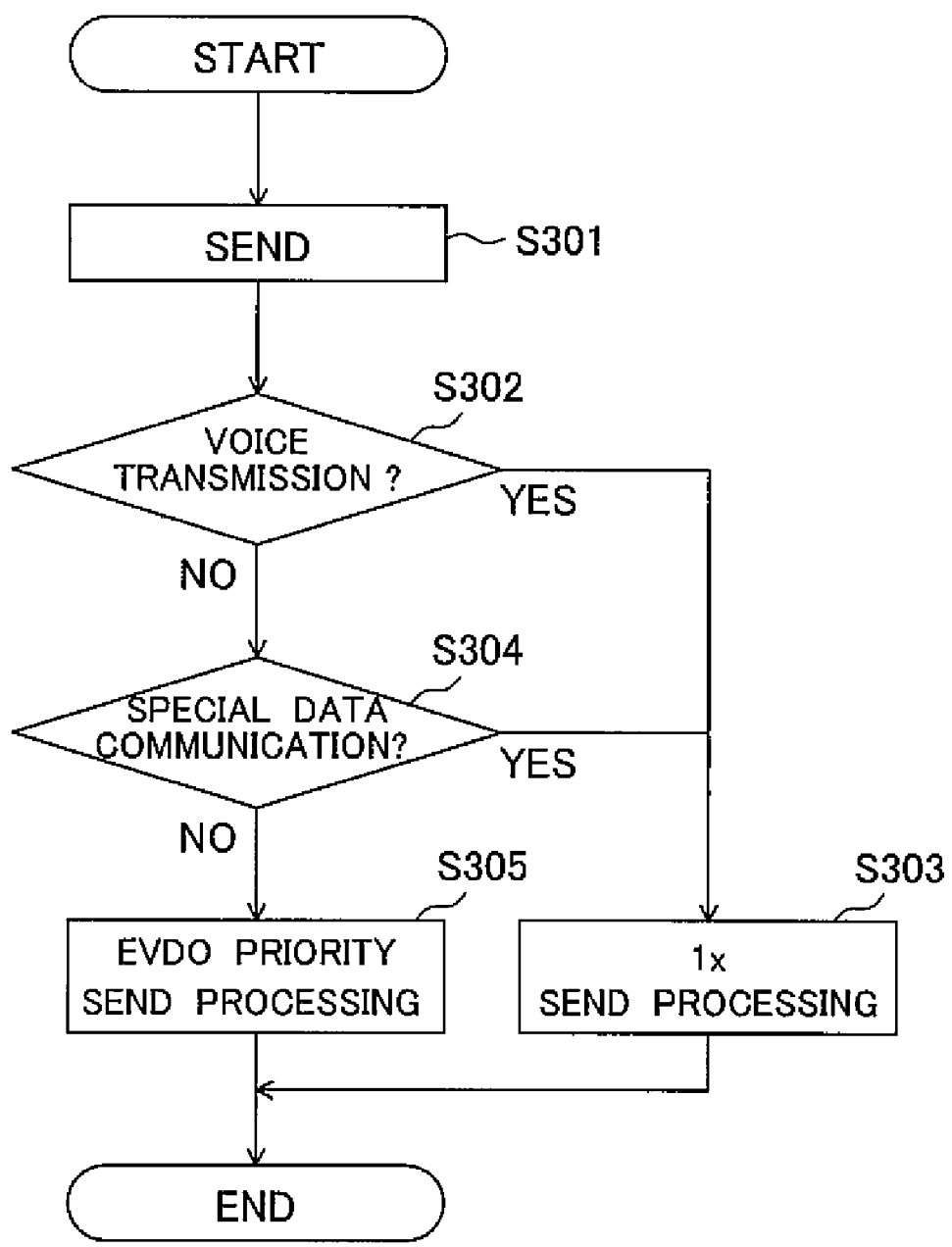
FIG. 7 is a flow chart cited for explaining the operation of a wireless communication terminal according to the second embodiment of the present invention.
Figure 8:
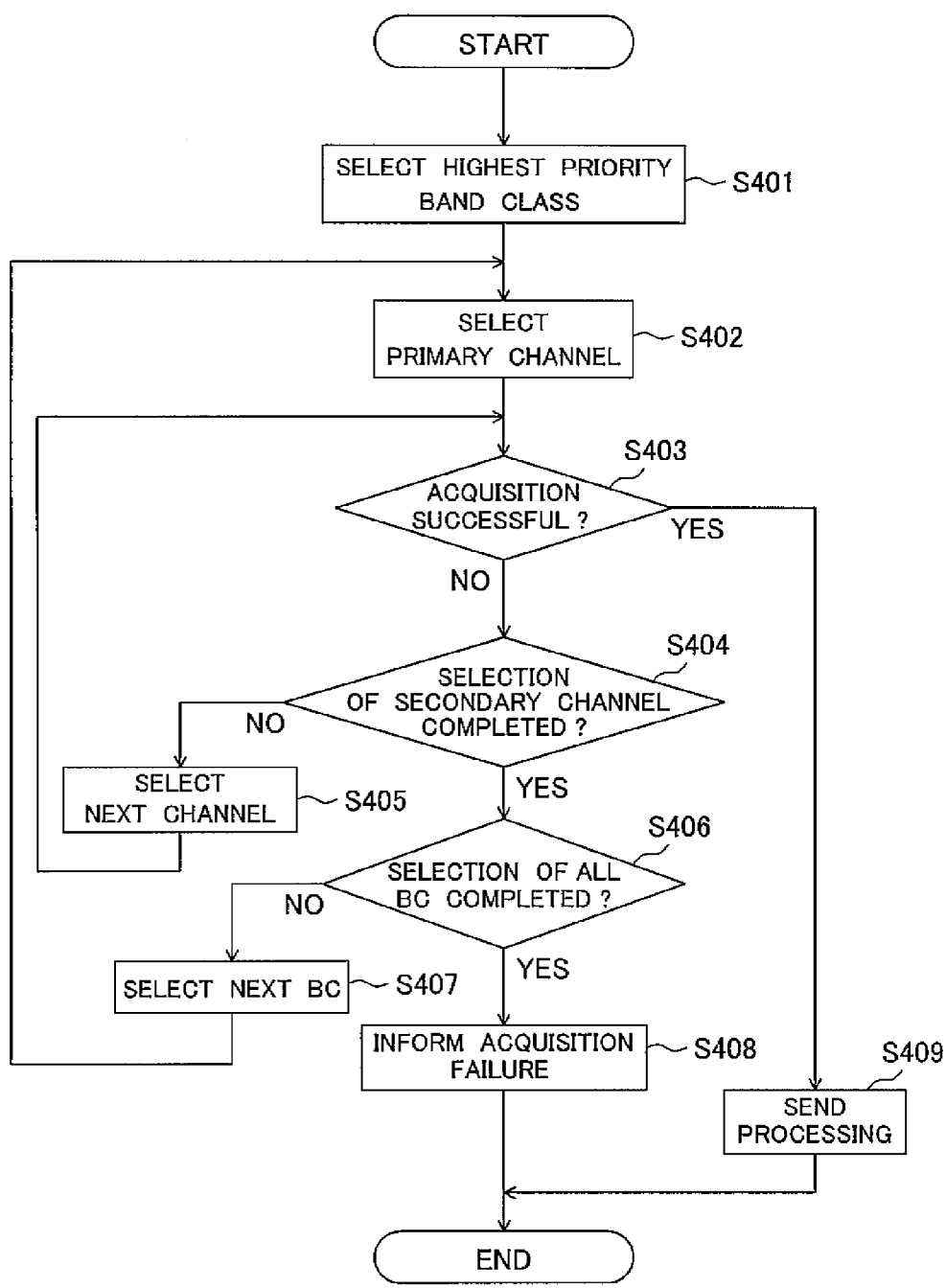
FIG. 8 is a flow chart cited for explaining the operation of a wireless communication terminal according to the second embodiment of the present invention.

Further, FIG. 7 is a diagram showing the flow of a communication protocol determination processing at the time of the start of the send processing, and FIG. 8 is a flow chart showing the flows of acquisition processing of the communication system.

Below, the operation of the wireless communication terminal of FIG. 2 according to the second embodiment of the present invention will be explained in detail with reference to FIG. 6 to FIG. 8.

First, when a key for start of communication such as the send key is depressed by the user operating the operation part 12, in the state "out of area", in the control part 18, the key detection part 18 obtains that send request and starts up the acquisition instruction function execution part 186 (S201 of FIG. 6).

At the startup of the acquisition instruction function execution part 186 described above, as shown in the flow chart of FIG. 7, the control part 18 judges whether the operation is a voice transmission or data communication when detecting presence/absence of a send operation via the key detection part 181 (S301 of FIG. 7) (S302).

Here, in the case of voice transmission, the control part 18 starts up the send processing based on the "1x" communication system (S303).

In the case of data communication, the control part 18 further starts up the send processing giving a higher priority to the EVDO communication system having a high data rate after confirming that this is not a special data communication by INS (Information Network System) connection etc. in which communication systems other than the "1x" system cannot be used (S304 "No", S305).

Returning the explanation to the sequence diagram of FIG. 6, before obtaining the send request described above and performing the send processing, the acquisition instruction function execution part 186 instructs the communication system selection part 185 to execute a system scan by a send operation giving a higher priority to EVDO in order to acquire the communication system required for the send operation.

This system scan is realized by the acquisition instruction function execution part 186 starting up the communication system selection part 185 (S202: system scan instruction) and by the communication system selection part 185 determining the communication system to be searched for with reference to the scan list 1850 and selecting and starting up the EVDO protocol execution part 183 (S203, S204).

Note that, at this time, the scan list 1850 stores five patterns of communication systems for EVDO which are set by default and can be searched by the wireless communication terminal itself.

The EVDO protocol execution part 183 selected and started up by the communication system selection part 185 first attempts acquisition of the communication system stored at the first place in the scan list 1850. Then, the EVDO protocol execution part 183 informs success/failure of acquisition of that communication system to the communication system selection part 185.

Here, if failure of acquisition of the communication system stored at the first place of the scan list 1850 is informed from the EVDO protocol execution part 183 (S205), the communication system selection part 185 does not inform the acquisition instruction function execution part 186 of the acquisition failure. In this way, when acquisition failure of the communication system is informed (S205), the communication system selection part 185 does not inform the part of acquisition failure, but instructs the EVDO protocol execution part 183 to run a system scan based on the communication system stored at the second place on the scan list 1850 (S206, S207).

When the acquisition of the communication system succeeds, the communication system selection part 185 instructs the acquisition instruction function execution part 186 to perform the send processing using that communication system.

On the other hand, when receiving a report of acquisition failure from the EVDO protocol execution part 183 (S208), in the same way as that described above, the communication system selection part 185 does not inform the acquisition instruction function execution part 186 of the acquisition failure, but instructs the EVDO protocol execution part 183 to run still another system scan by selecting the remaining three patterns' worth of the communication systems stored in the scan list 1850 each time and instructing the execution of the system scan based on each communication system.

The communication system selection part 185 sends the EVDO protocol execution part 184 a scan instruction of the communication system (fifth pattern) stored at the last place on the scan list 1850 (S209, S210). Then, when acquisition failure is informed from the EVDO protocol execution part 184 as the result of this system scan (S211), the communication system selection part 185 informs the acquisition instruction function execution part 186 of the acquisition failure (turns ON the acquisition failure flag FLG) (S211).

Note that after instructing the communication system selection part 185 of the execution of the system scan due to the send operation, the acquisition instruction function execution part 186 waits, for example, for 4 seconds (first predetermined time) before informing success/failure of acquisition (that is, confirmation of presence/absence of flag update) to the acquired result report region 1860.

Here, when no report of acquisition success is output from the communication system selection part 185 for 4 seconds and there is no flag of acquisition failure either, the acquisition instruction function execution part 186 refers to the presence/absence of a flag FLG to the acquired result report region 1860 in a cycle of 1 second (second predetermined time).

When report of success/failure of acquisition is not confirmed irrespective of this, the acquisition instruction function execution part 186 instructs the execution of the system scan by sending six patterns using the "1x" protocol to the communication system selection part 185 (S213).

This system scan is realized by the acquisition instruction function execution part 186 starting up the communication system selection part 185 and the communication system selection part 185 selecting and starting up the "1x" protocol execution part 184 according to the "1x" communication system stored at the first index of the scan list 1850 (S214, S215).

Next, the selected and started up "1x" protocol execution part 184 informs success/failure of acquisition of the foregoing communication system for which the acquisition attempt was made to the communication system selection part 185.

Here, when acquisition failure of the communication system stored at the first place on the scan list 1850 is informed from the "1x" protocol execution part 184 (S216), the communication system selection part 185 does not inform the acquisition instruction function execution part 186 of the acquisition failure. In this way, if acquisition failure of the communication system is informed (S216), the communication system selection part 185 does not inform the acquisition failure, but instructs the "1x" protocol execution part 184 to run a system scan based on the communication system stored at the second place on the scan list 1850.

When succeeding in the acquisition of that communication system, the communication system selection part 185 instructs the acquisition instruction function execution part 186 to perform send processing using that communication system.

When receiving the report of acquisition failure from the "1x" protocol execution part 184, in the same way as that described above, the communication system selection part 185 does not inform the acquisition instruction function execution part 186 of the acquisition failure. In this way, if a report of acquisition failure is received, the communication system selection part 185 does not inform the acquisition failure, but selects the remaining four patterns' worth of the communication systems for each reception so as to instruct the execution of still another system scan to the "1x" protocol execution part 184 and instructs the execution of the system scan based on each communication system.

The communication system selection part 185 sends to the "1x" protocol execution part 183 a scan instruction of the sixth pattern of the communication system stored at the last index of the scan list 1850 (S217, S218).

When acquisition failure is reported from the "1x" protocol execution part 183 as a result of this system scan (S219), the communication system selection part 185 informs the acquisition instruction function execution part 186 of the acquisition failure (turns ON the acquisition failure flag FLG to 1860) (S220).

Note that at the timing of step S213 when the system scan instruction in the "1x" protocol was sent, the acquisition instruction function execution part 186 starts the timer of the first predetermined time (4 seconds) again and confirms presence/absence of a new failure flag for the acquired result report region 1860 after the elapse of 4 seconds.

Further, the processing for confirming presence/absence of a new failure flag for the acquired result report region 1860 by the second predetermined time (1 second) cycle in the case where the flag cannot be confirmed after the expiration of 4 seconds is the same as that at the time of the system scan in EVDO.

After step S220, when confirming the flag is ON based on the acquisition failure of the communication system of the 6th pattern of the scan list 1850, the acquisition instruction function execution part 186 controls the display control part 182 to display the failure of the send operation at the display part 16 (S221).

As explained above, in the first embodiment, when the communication system selection part 185 requested a system scan due to a send operation be run from the acquisition instruction function execution part 186, the selection part informed the acquisition instruction function execution part 186 of the acquisition failure as the result of failure of the acquisition of one communication system.

As opposed to this, according to the second embodiment, the fact that the acquisition fails is not informed to the acquisition instruction function execution part 186 unless the results of the attempted acquisition operation with respect to all communication systems stored in the scan list 1850 are acquisition failure.

Namely, when the result of the attempted acquisition operations for all of the communication systems on the scan list 1850 is that no communication systems could be acquired, the communication system selection part 185 informs the acquisition instruction function execution part 186 of acquisition failure.

Further, in the first embodiment, the acquisition instruction function execution part 186 requested a system scan to the communication system selection part 185 as a result of a system scan due to a send operation. Further, the acquisition instruction function execution part 186 issued a system scan request again to the communication system selection part 185 where there was no response from the communication system selection part 185 or there was no report of acquisition success during 4 seconds after requesting the system scan.

As opposed to this, in the second embodiment, the communication system selection part 185 does not request the system scan again unless the flag of acquisition failure is updated as a result of running system scans for to all systems.

Note that where there was a report of acquisition success from the communication system selection part 185, in the same way as the first embodiment, the send processing is quickly performed on the successfully acquired communication system.

According to the present second embodiment described above, the acquisition instruction function execution part 186 does not issue a system scan request due to a send operation again until the receiving a report of acquisition failure from the communication system selection part 185. Further, if the system scan request due to a send operation is issued from the acquisition instruction function execution part 186, acquisition failure is confirmed as a result of repetition of the attempted acquisition for all of the communication systems existing on the scan list 1850, the communication system selection part 185 informs this to the acquisition instruction function execution part 186.

Due to this, the occurrence of a case where a send operation cannot be performed since there is no opportunity for acquiring a communication system regardless of the existence of a communication system which can be acquired can be suppressed.

As explained above, according to the second embodiment of the present invention, acquisition is attempted for all communication systems existing on the scan list 1850 at the time of a send operation "out of area", therefore the send success ratio is improved.

Further, at step S303 of FIG. 7, where send processing by the "1x" protocol is carried out, the processing of the latter half of the second embodiment of the present invention will be executed.

Namely, only the processing of step S213 and the following steps in FIG. 6 will be executed. In this case, the flag of the acquisition failure is not set ON either until the scan of all systems in the "1x" protocol, while conversely acquisition success is immediately reported when acquisition is successful.

The acquisition instruction function execution part 186 waits for the report of the acquisition success after sending the system scan instruction, checks the acquired result report region 1860 every time a first or second predetermined time has passed, and performs control so as to quickly perform the connection processing when acquisition success is reported and to make the display part display send failure when confirming the failure flag.

In this way, according to the second embodiment of the present invention, even at the time of the "1x" send processing, basically the processing can be performed by the same acquisition processing routine. It is not necessary to separately provide an acquisition processing routine. This is useful for preventing the program for the send processing from becoming larger.

Further, the system is configured so that in an environment where acquisition by EVDO would fail at the time of requesting a send operation in data communication, not only can failure be judged quickly, but also acquisition by the "1x" protocol can be immediately attempted, so the chance of successful communication is increased much more.

The flow of the processing for acquisition of the communication system described above is shown as the flow chart in FIG. 8. Below, in the sense of furthering the understanding of the explanation of the operation sequence shown in FIG. 6, the operation of acquisition of a communication system will further explained with reference to the flow chart shown in FIG. 8.

In FIG. 8, the communication system selection part 185 first selects the highest priority band class (band class 6) so as to acquire the communication system required for the send operation before the acquisition instruction function execution part 186 receives the send request and executes that send processing (S401).

Next, the communication system selection part 185 selects the primary channel (S402), starts up the EVDO protocol execution part 183 or the "1x" protocol execution part 184, and runs a system scan due to the send operation.

At present, as band classes, there are three types of "3 (present 800 MHz band)", "0 (new 800 MHz band)", and "6 (2 GHz band)". Here, the system scan due to the send operation is executed according to a priority of "2 GHz band→new 800 MHz band→present 800 MHz band". To the band classes, further, a primary channel and a secondary channel are assigned (note, the 2 GHz band EVDO is not assigned a secondary channel since the number of adaptive wireless communication terminals is small). A higher priority is given to the primary channel of the selected band class.

Next, the communication system selection part 185 judges the presence/absence of acquisition success of that communication system (S403) and returns a response to the acquisition instruction function execution part 186 to execute the send processing using that communication system in the case of acquisition success (S409).

On the other hand, in the case of acquisition failure, the communication system selection part 185 judges whether or not selection of the secondary channel of that band class has been completed (S404).

Where it has not been completed, the communication system selection part 185 selects that secondary channel (S405) and returns to the processing of step S403 (judgment of success/failure of acquisition). When the selection of the secondary channel has been completed, it further judges whether or not the selection of all band classes (BC) has been completed (S406).

Note that when the selection of all BC has not yet been completed in the processing of step S406, the part selects the BC to be given the priority next and returns to the processing of S402 (selection of primary channel).

Further, when the selection of all BC has been completed, the acquisition failure flag FLG is set on for the acquired result report region 1860 of the acquisition instruction function execution part 186 so as to report acquisition failure (S408).

Further, the acquisition instruction function execution part 186 checks the flag FLG of the acquired result report region 1860 by a predetermined cycle. When the acquisition failure flag ON is detected, the part 186 controls the display control part 182 to displays on the display part 16 the fact that the send operation failed.

Note that the acquisition instruction function execution part 186 starts counting 4 seconds as the first predetermined time at the timing of send the communication system selection part 185 a send instruction. Incidentally, the second predetermined time shorter than that is 1 second.

The first predetermined time is 4 seconds because the scan of all communication systems relating to EVDO communication is usually completed within 4 seconds if there is no particular obstacle. Therefore, this is set in the present embodiment.

Note that in the CDMA communication, decoding is required for the acquisition of the communication system. Four or more seconds are sometimes required under a signal environment where such decoding is apt to fail. Accordingly, in the present embodiment, the configuration is made so that the result can be judged faster by judging presence/absence of a report of acquisition failure at a shorter time interval when the acquisition result is unclear even when 4 seconds have passed.

Note that, in the operation sequence diagram shown in FIG. 6, the processes (steps) of a communication control method of a wireless communication terminal according to an embodiment of the present invention are shown together.

Namely, the communication control method of a wireless communication terminal according to the present embodiment is a communication control method of a wireless communication terminal having a communication part 11 acquiring a plurality of communication systems and performing communications according to a first communication protocol (EVDO) and a second communication protocol ("1x" protocol), an operation part 12, and a control part 18 which includes a communication system selection part 185, first protocol execution part 183, second protocol execution part 184, and acquisition instruction function execution part 186 and controls the communication by the communication part 11 by using the first communication protocol or second communication protocol in any of the plurality of communication systems when the start of communication is instructed by the operation part 12.

This communication control method basically has the following first to seventh steps.

At the first step (S201, S202), in a state judged "out of area" wherein the communication is not possible and when a send operation by the operation part 12 is detected, the acquisition instruction function execution part 186 sends the communication system selection part 185 a first acquisition instruction instructing the acquisition of any of the plurality of communication systems.

At the second step (S203 to S211), the first protocol execution part 183 executes the acquisition processing for each of the plurality of communication systems based on the first step until the acquisition is successful.

At the third step (S212), the communication system selection part 185 informs the failure of acquisition to the acquisition instruction function execution part 186 when not able to acquire any of the communication systems at the second step.

At the fourth step (S213), the acquisition instruction function execution part 186 receives a report of acquisition failure and sends the communication system selection part 185 a second acquisition instruction.

At the fifth step (S214 to S219), the second protocol execution part 184 executes the acquisition processing for each of the plurality of communication systems based on the fourth step until the acquisition is successful.

At the sixth step (S220), the communication system selection part 185 informs the acquisition instruction function execution part 186 of the failure of the acquisition when not able to acquire any of the communication systems at the fifth step.

At the seventh step (corresponding step not shown), when the communication system selection part 185 succeeds in acquisition of any communication system in the second step or fifth step, the part 185 informs the acquisition instruction function execution part 186 of the successful acquisition in a sixth step (corresponding step not shown), and the acquisition instruction function execution part 186 performs the processing for start of communication by the successfully acquired communication system upon receipt of the report of the acquisition success.

According to the communication control method of a wireless communication terminal according to the embodiment of the present invention described above, a wireless communication terminal having a plurality of communication schemes can efficiently acquire a communication system when a send operation is performed even in a state judged "out of area" and can attempt connection by the communication scheme desired by the user as much as possible.

Note that, according to the first embodiment and the second embodiment described above, the mobile phone was exemplified as the wireless communication terminal, but the same effects are obtained even when it is applied to other devices such as a PDA (Personal Digital Assistant), PC (Personal Computer), or game machine.

Further, the functions of the constituent blocks of the wireless communication terminal of the present invention may be all realized by software or at least a portion may be realized by hardware. For example, the processing in the control part 18 and the data processing in the communication part 11 and the voice processing part 13 may be realized in a computer by one or more programs. Further, at least a portion may be realized by hardware as well.

In a mobile phone or other wireless communication terminal, usually only one control part is provided for performing the send processing and the processing is a single task, so the more the opportunities for interruption in each processing function part, the slower the processing time.

It was explained that the time of 4 seconds was set as the first predetermined time based on the fact that the scan of all systems is usually completed in 4 seconds. Namely, this "4 seconds" means a reduction of the opportunities for interruption for check processing by the acquisition instruction function execution part 186 and leads to elimination of delay of the acquisition processing.

Further, even when acquisition is troublesome, it is predicted that only a time slightly over 4 seconds would be required in most cases, so the present invention is configured so as to cause an interruption for a flag check by a second predetermined time cycle of 1 second—which is shorter than after the elapse of 4 seconds. Due to this, it can be judged whether or not the acquisition is successful while preventing an adverse influence upon the acquisition time as much as possible and in a time as short as possible.

Further, even in the case of judging the acquisition failure, 40 seconds were required in the case of the first embodiment. However, according to the second embodiment, failure can be judged in a time shorter than that and with a higher precision, therefore this has an effect of suppression of power consumption accompanying useless attempts of acquisition.

Industrial Applicability

According to the present invention, even when a send operation is performed in a state judged "out of area", it is possible to efficiently acquire a communication system and to attempt connection according to the communication scheme desired by the user as much as possible. Therefore, the invention can be applied to a mobile phone or other wireless communication terminal used for a multiband wireless communication system.

The invention claimed is:

1. A wireless communication terminal comprising:
   a communication part capable of acquiring a plurality of communication systems and capable of both communication by a first communication protocol and communication by a second communication protocol;
   an operation part; and
   a control part which controls communication by the communication part by any of the plurality of communication systems using the first communication protocol or second communication protocol when the start of communication is instructed by the operation part, the control part having:
    a communication system selection part instructing the communication part of the communication system to be acquired,
    a first protocol execution part instructing the communication part of acquisition by the first communication protocol,
    a second protocol execution part instructing the communication part of acquisition by the second communication protocol, and
    an acquisition instruction function execution part instructing the communication system selection part of the start of acquisition of the communication system, wherein
the acquisition instruction function execution part sends to the communication system selection part, a first acquisition instruction instructing the acquisition of any of the plurality of communication systems when detecting a send operation by the operation part in a state judged "out of area" in which communication cannot be carried out, sends to the communication system selection part a second acquisition instruction when acquisition failure is informed for the first acquisition instruction, and performs processing for starting communication by a successful acquired communication system when acquisition success is informed for the first acquisition instruction or the second acquisition instruction,
the communication system selection part
    makes the first protocol execution part perform the acquisition processing according to the first acquisition instruction for each of the plurality of communication systems until the acquisition is successful, informs the acquisition instruction function execution part that the acquisition failed when acquisition failed in all of the communication systems, and informs the acquisition instruction function execution part that the acquisition was successful when the acquisition was successful in any communication system, and
    makes the second protocol execution part perform the acquisition processing according to the second acquisition instruction for each of said plurality of communication systems until the acquisition is successful, informs the acquisition instruction function execution part of the acquisition failure when acquisition failed in all communication systems, and informs the acquisition instruction function execution part of the acquisition success when the acquisition is successful in any communication system, and
    the acquisition instruction function execution part judges if there was any notification of acquisition failure when a first predetermined time passes from when the first acquisition instruction was carried out and judges if there was any notification of acquisition failure by a cycle of a second predetermined time shorter than the first predetermined time when acquisition failure is not informed.

2. A wireless communication terminal as set forth in claim 1, wherein the plurality of communication systems comprise communication systems with different frequency bands.

3. A wireless communication terminal as set forth in claim 1, wherein the plurality of communication systems include communication systems with different band classes in CDMA (Code Division Multiple Access) communication.

4. A wireless communication terminal as set forth in claim 3, wherein the plurality of communication systems comprise a primary channel and a secondary channel relating to communication systems with different band classes.

5. A wireless communication terminal as set forth in claim 1, wherein the communication system selection part repeatedly executes the acquisition processing based on the first acquisition instruction during a first predetermined time.

6. A wireless communication terminal as set forth in claim 1, wherein
    the acquisition instruction function execution part sends the communication system selection part a third acquisition instruction when the send operation is an operation for voice transmission, and
    the communication system selection part makes the second protocol execution part perform the acquisition processing for each of the plurality of communication systems until the acquisition is successful when receiving the third acquisition instruction, informs the acquisition instruction function execution part of the failure of acquisition when acquisition fails in all of the communication systems, and informs the acquisition instruction function execution part that the acquisition is successful when the acquisition is successful in any communication system.

7. A wireless communication terminal as set forth in claim 1, wherein
    the acquisition instruction function execution part sends the communication system selection part a third acquisition instruction when the send operation is an operation for voice transmission, and
    the communication system selection part makes the second protocol execution part perform the acquisition processing for each of the plurality of communication systems according to the third acquisition instruction until the acquisition is successful, informs the acquisition instruction function execution part of the failure of acquisition when acquisition fails in all communication systems, and informs it that the acquisition is successful when the acquisition is successful in any communication system.

8. A wireless communication terminal comprising:
    a display part;
    a communication part capable of acquiring a plurality of communication systems and capable of both communication by a first communication protocol and communication by a second communication protocol;
    an operation part; and
    a control part which controls communication by the communication part by any of the plurality of communication systems using the first communication protocol or second communication protocol when the start of communication is instructed by the operation part,
    the control part having:
        a communication system selection part instructing the communication part of the communication system to be acquired,
        a first protocol execution part instructing the communication part of acquisition by the first communication protocol,
        a second protocol execution part instructing the communication part of acquisition by the second communication protocol, and
        an acquisition instruction function execution part instructing the communication system selection part of the start of acquisition of the communication system, wherein
    the acquisition instruction function execution part sends to the communication system selection part, a first acquisition instruction instructing the acquisition of any of the plurality of communication systems when detecting a send operation by the operation part in a state judged "out of area" in which communication cannot be carried out, sends to the communication system selection part a second acquisition instruction when acquisition failure is informed for the first acquisition instruction, and performs processing for starting communication by a successful acquired communication system when acquisition success is informed for the first acquisition instruction or the second acquisition instruction, the communication system selection part
  makes the first protocol execution part perform the acquisition processing according to the first acquisition instruction for each of the plurality of communication systems until the acquisition is successful, informs the acquisition instruction function execution part that the acquisition failed when acquisition failed in all of the communication systems, and informs the acquisition instruction function execution part that the acquisition was successful when the acquisition was successful in any communication system, and
  makes the second protocol execution part perform the acquisition processing according to the second acquisition instruction for each of said plurality of communication systems until the acquisition is successful, informs the acquisition instruction function execution part of the acquisition failure when acquisition failed in all communication systems, and informs the acquisition instruction function execution part of the acquisition success when the acquisition is successful in any communication system, and the acquisition instruction function execution part detects a send operation by the operation part in a state judged "out of area" and makes the display part display the failure of the send operation when acquisition failure by the second acquisition instruction is informed after acquisition failure by the first acquisition instruction is informed.

9. A wireless communication terminal as set forth in claim 8, wherein the state "out of area" is defined as a state where neither the first protocol execution part nor the second protocol execution part can acquire any of the plurality of communication systems, the acquisition instruction function execution part makes the display part display "out of area", and the "in-area" reset processing by the communication part is executed.

10. A communication control method of a wireless communication terminal comprising a communication system selection part and a control part including a first protocol execution part, a second protocol execution part, and an acquisition instruction function execution part, which can acquire a plurality of communication systems, which can execute both communication according to a first communication protocol and communication according to a second communication protocol, and which can control communication by any of the plurality of communication systems by using the first communication protocol or second communication protocol when start of communication is instructed by a predetermined operation, said method including:

a first step in which the acquisition instruction function execution part sends the communication system selection part, a first acquisition instruction which instructs the acquisition of any of the plurality of communication systems, when detecting a send operation in a state judged "out of area" in which communication cannot be carried out,
  a second step in which the first protocol execution part executes the acquisition processing based on the first step, for each of the plurality of communication systems, until the acquisition is successful,
  a third step in which the communication system selection part informs the acquisition instruction function execution part, the failure of acquisition when acquisition is not possible in any of the communication systems in the second step,
  a fourth step in which the acquisition instruction function execution part receives a notification of the acquisition failure and sends the communication system selection part, a second acquisition instruction,
  a fifth step in which the second protocol execution part executes the acquisition processing based on the fourth step for each of the plurality of communication systems until the acquisition is successful,
  a sixth step in which the communication system selection part informs the acquisition instruction function execution part, the failure of acquisition when acquisition is not possible in any of all communication systems in the fifth step,
  a seventh step in which the communication system selection part informs the acquisition instruction function execution part, the success of acquisition when the acquisition is successful in any communication system in the second step or fifth step,
  an eighth step in which the acquisition instruction function execution part receives the notification of success of acquisition and performs processing for starting communication by the successfully acquired communication system, and
  a ninth step in which the acquisition instruction function execution part judges if there was any notification of acquisition failure when a first predetermined time passes from when the first acquisition instruction was carried out and judge if there was any notification of acquisition failure by a cycle of a second predetermined time shorter than the first predetermined time when acquisition failure is not informed.

11. A communication control method of a wireless communication terminal as set forth in claim 10, wherein, in the first step, the communication system selection part repeatedly executes the acquisition processing based on the first acquisition instruction during a first predetermined time.

12. A communication control method of a wireless communication terminal comprising a communication system selection part and a control part including a first protocol execution part, a second protocol execution part, and an acquisition instruction function execution part, which can acquire a plurality of communication systems, which can execute both communication according to a first communication protocol and communication according to a second communication protocol, and which can control communication by any of the plurality of communication systems by using the first communication protocol or second communication protocol when start of communication is instructed by a predetermined operation, said method including:

a first step in which the acquisition instruction function execution part sends the communication system selection part, a first acquisition instruction which instructs the acquisition of any of the plurality of communication systems, when detecting a send operation in a state judged "out of area" in which communication cannot be carried out,
  a second step in which the first protocol execution part executes the acquisition processing based on the first step, for each of the plurality of communication systems, until the acquisition is successful, a third step in which the communication system selection part informs the acquisition instruction function execution part, the failure of acquisition when acquisition is not possible in any of the communication systems in the second step, a fourth step in which the acquisition instruction function execution part receives a notification of the acquisition failure and sends the communication system selection part, a second acquisition instruction, a fifth step in which the second protocol execution part executes the acquisition processing based on the fourth step for each of the plurality of communication systems until the acquisition is successful, a sixth step in which the communication system selection part informs the acquisition instruction function execution part, the failure of acquisition when acquisition is not possible in any of all communication systems in the fifth step, a seventh step in which the communication system selection part informs the acquisition instruction function execution part, the success of acquisition when the acquisition is successful in any communication system in the second step or fifth step, an eighth step in which the acquisition instruction function execution part receives the notification of success of acquisition and performs processing for starting communication by the successfully acquired communication system, and a ninth step in which the acquisition instruction function execution part detects a send operation in a state judged "out of area" and displays the failure of the send operation when acquisition failure by the second acquisition instruction is informed after acquisition failure by the first acquisition instruction is informed.

13. A communication control method of a wireless communication terminal as set forth in claim 12, wherein the state "out of area" is defined as a state where neither the first protocol execution part nor the second protocol execution part can acquire any of the plurality of communication systems, the acquisition instruction function execution part makes the display part display "out of area", and the "in-area" reset processing by the communication part is executed.

14. A communication control method of a wireless communication terminal comprising a communication system selection part and a control part including a first protocol execution part, a second protocol execution part, and an acquisition instruction function execution part, which can acquire a plurality of communication systems, which can execute both communication according to a first communication protocol and communication according to a second communication protocol, and which can control communication by any of the plurality of communication systems by using the first communication protocol or second communication protocol when start of communication is instructed by a predetermined operation, said method including:

a first step in which the acquisition instruction function execution part sends the communication system selection part, a first acquisition instruction which instructs the acquisition of any of the plurality of communication systems, when detecting a send operation in a state judged "out of area" in which communication cannot be carried out, a second step in which the first protocol execution part executes the acquisition processing based on the first step, for each of the plurality of communication systems, until the acquisition is successful, a third step in which the communication system selection part informs the acquisition instruction function execution part, the failure of acquisition when acquisition is not possible in any of the communication systems in the second step, a fourth step in which the acquisition instruction function execution part receives a notification of the acquisition failure and sends the communication system selection part, a second acquisition instruction, a fifth step in which the second protocol execution part executes the acquisition processing based on the fourth step for each of the plurality of communication systems until the acquisition is successful, a sixth step in which the communication system selection part informs the acquisition instruction function execution part, the failure of acquisition when acquisition is not possible in any of all communication systems in the fifth step, a seventh step in which the communication system selection part informs the acquisition instruction function execution part, the success of acquisition when the acquisition is successful in any communication system in the second step or fifth step, an eighth step in which the acquisition instruction function execution part receives the notification of success of acquisition and performs processing for starting communication by the successfully acquired communication system, a ninth step of performing a third acquisition instruction by the acquisition instruction function execution part with respect to the second protocol execution part where the send operation is the operation of voice transmission, and a tenth step of performing the acquisition processing by the second protocol execution part for said each plurality of communication systems until the acquisition is successful when receiving the third acquisition instruction, informing the failure of acquisition to the acquisition instruction function execution part where the acquisition fails in all communication systems, and while informing that the acquisition is successful where the acquisition is successful in any communication system.

15. A wireless communication system comprising;

a base station; and a wireless communication terminal performing wireless communication with the base station through a channel assigned by the base station, wherein the wireless communication terminal has:

a communication part capable of acquiring a plurality of communication systems and capable of executing both of communication according to a first communication protocol and communication according to a second communication protocol, an operation part, and a control part which controls communication by the communication part by using the first communication protocol or second communication protocol in any of the plurality of communication systems when start of communication is instructed by the operation part, the control part includes:

a communication system selection part instructing the communication part of the communication system to be acquired, a first protocol execution part instructing the communication part of the acquisition by the first communication protocol, a second protocol execution part instructing the communication part of the acquisition by the second communication protocol, and an acquisition instruction function execution part instructing the communication system selection part of the start of acquisition of the communication system, wherein the acquisition instruction function execution part sends the communication system selection part a first acquisition instruction instructing the acquisition of any of the plurality of communication systems when detecting a send operation by the operation part in a state judged "out of area" in which communication cannot be carried out, sends the communication system selection part a second acquisition instruction when acquisition failure is informed for the first acquisition instruction, and performs processing to start communication by a successfully acquired communication system when acquisition success is informed for the first acquisition instruction or the second acquisition instruction, the communication system selection part makes the first protocol execution part perform the acquisition processing according to the first acquisition instruction for each of the plurality of communication systems until the acquisition is successful, informs the acquisition instruction function execution part that the acquisition failed when acquisition fails in all communication systems, while informs the acquisition instruction function execution part that acquisition is successful when acquisition is successful in any communication system, and makes the second protocol execution part perform the acquisition processing according to the second acquisition instruction for each of the plurality of communication systems until the acquisition is successful, informs the acquisition instruction function execution part of acquisition failure when acquisition fails in all communication systems, while informs the acquisition instruction function execution part of acquisition success when acquisition is successful in any communication system, and the acquisition instruction function execution part judges if there was any notification of acquisition failure when a first predetermined time passes from when the first acquisition instruction was carried out and judges if there was any notification of acquisition failure by a cycle of a second predetermined time shorter than the first predetermined time when acquisition failure is not informed.

* * * * *